March 10, 1964 N. HUMEN 3,124,232
ELECTRON TUBE APPARATUS
Filed June 1, 1961 4 Sheets-Sheet 1
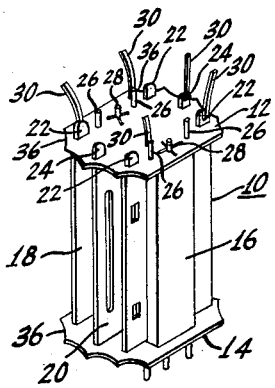
*Fig. 1.*
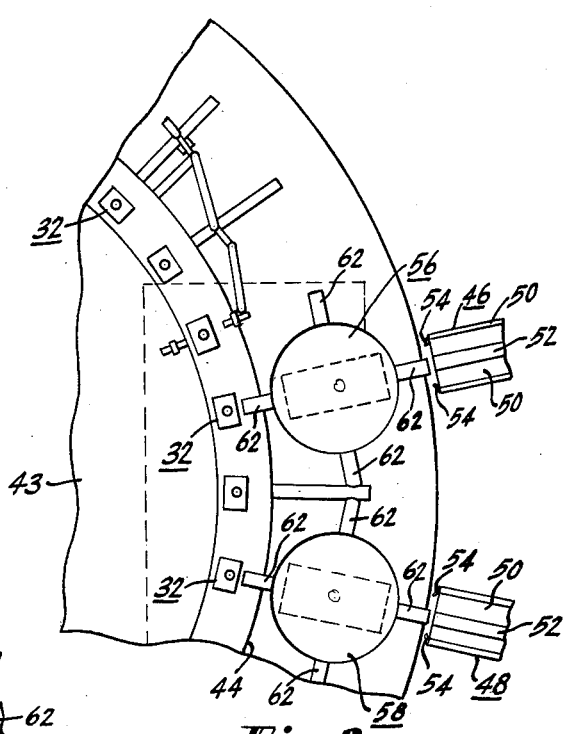
*Fig. 2.*
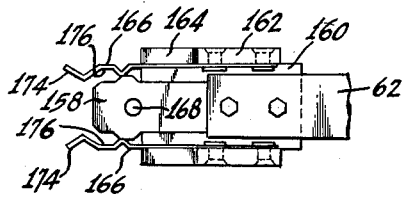
*Fig. 5.*
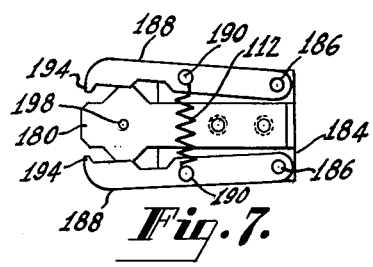
*Fig. 6.* *Fig. 7.*
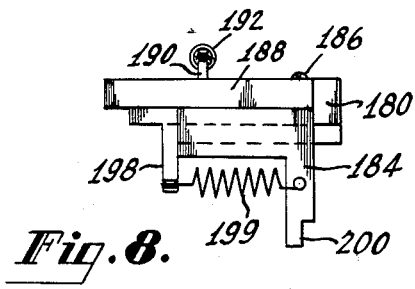
*Fig. 8.*
INVENTOR.
NICHOLAS HUMEN
BY
William A. Zalesak
ATTORNEY March 10, 1964  N. HUMEN  3,124,232
ELECTRON TUBE APPARATUS
Filed June 1, 1961  4 Sheets-Sheet 2
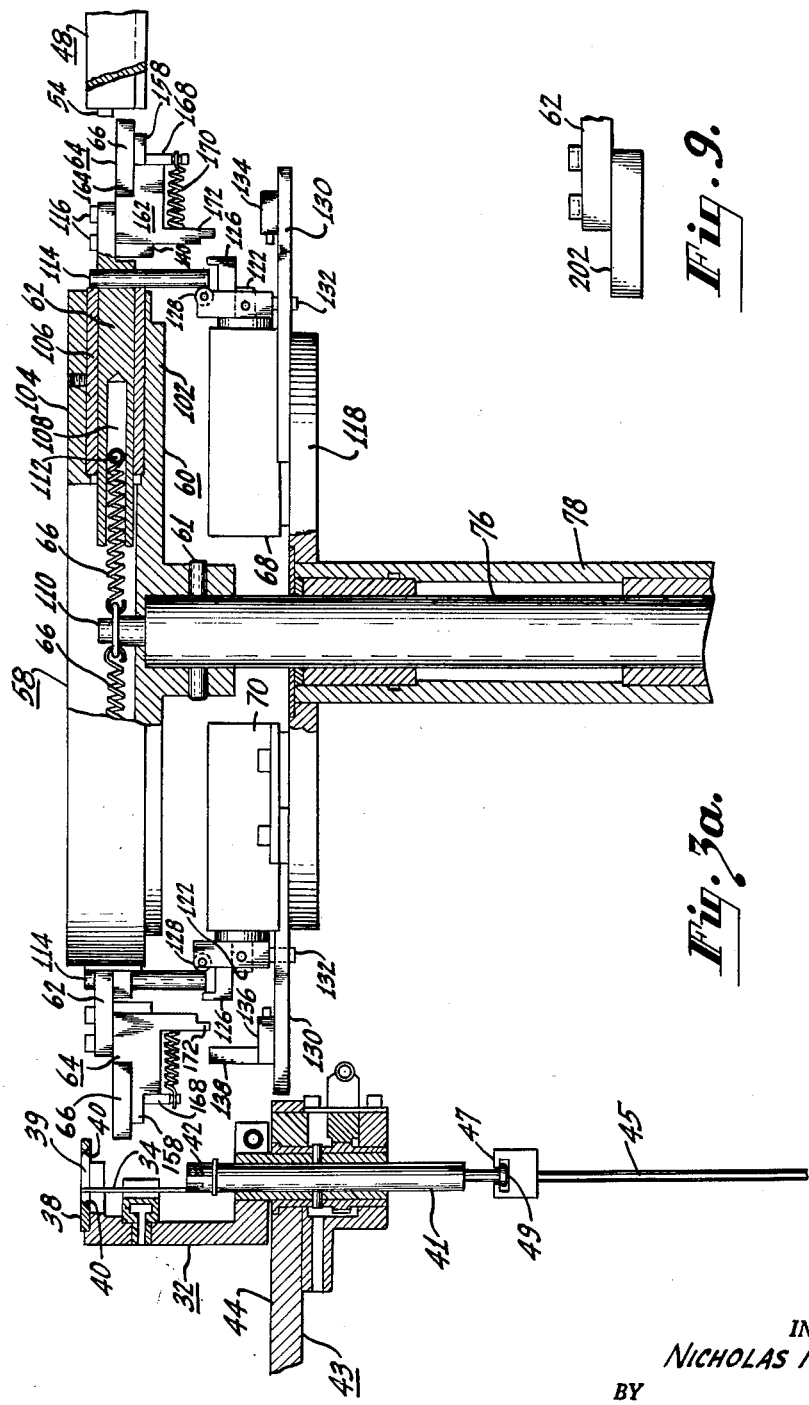
INVENTOR.
NICHOLAS HUMEN
BY
William A. Zalesak
ATTORNEY

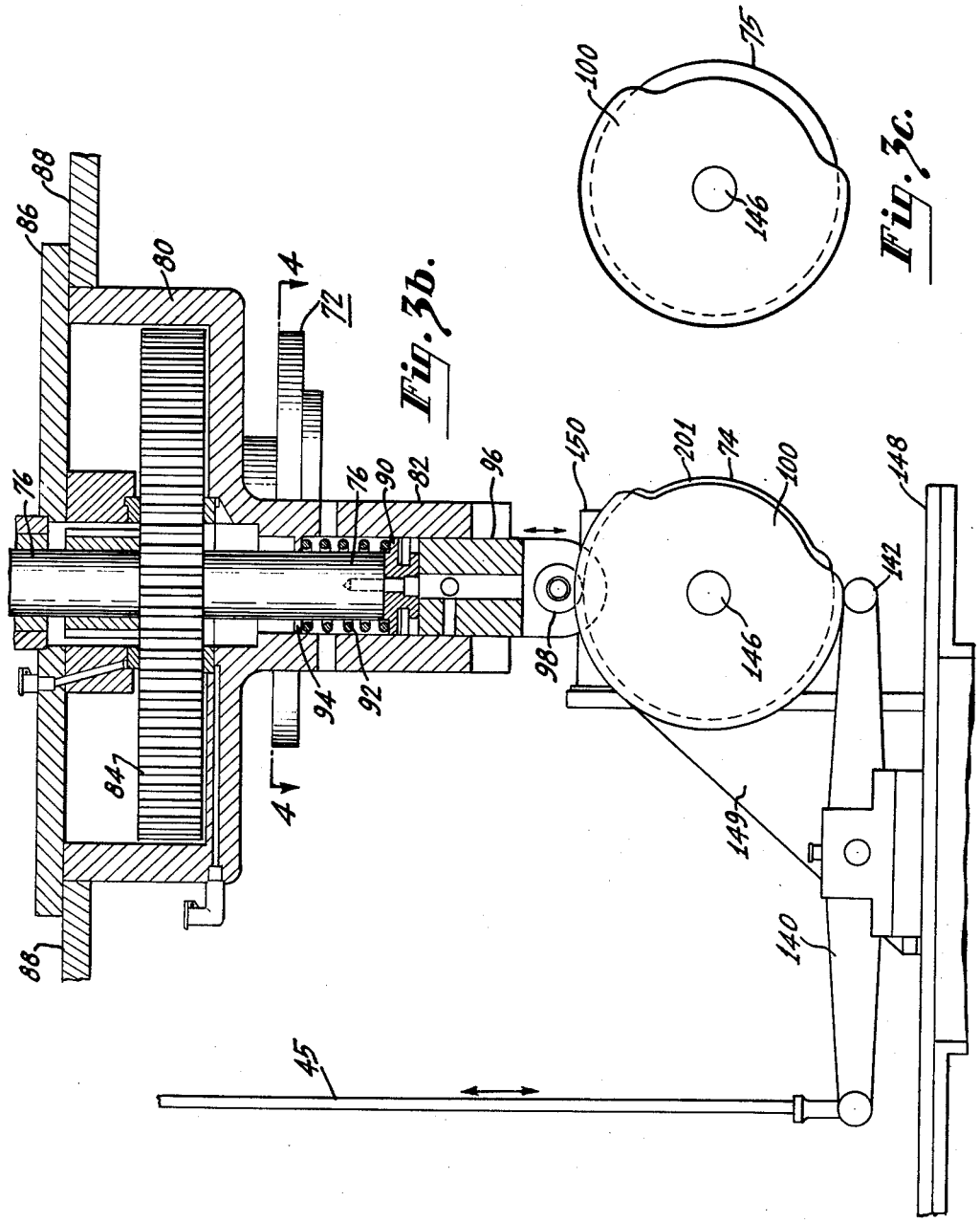

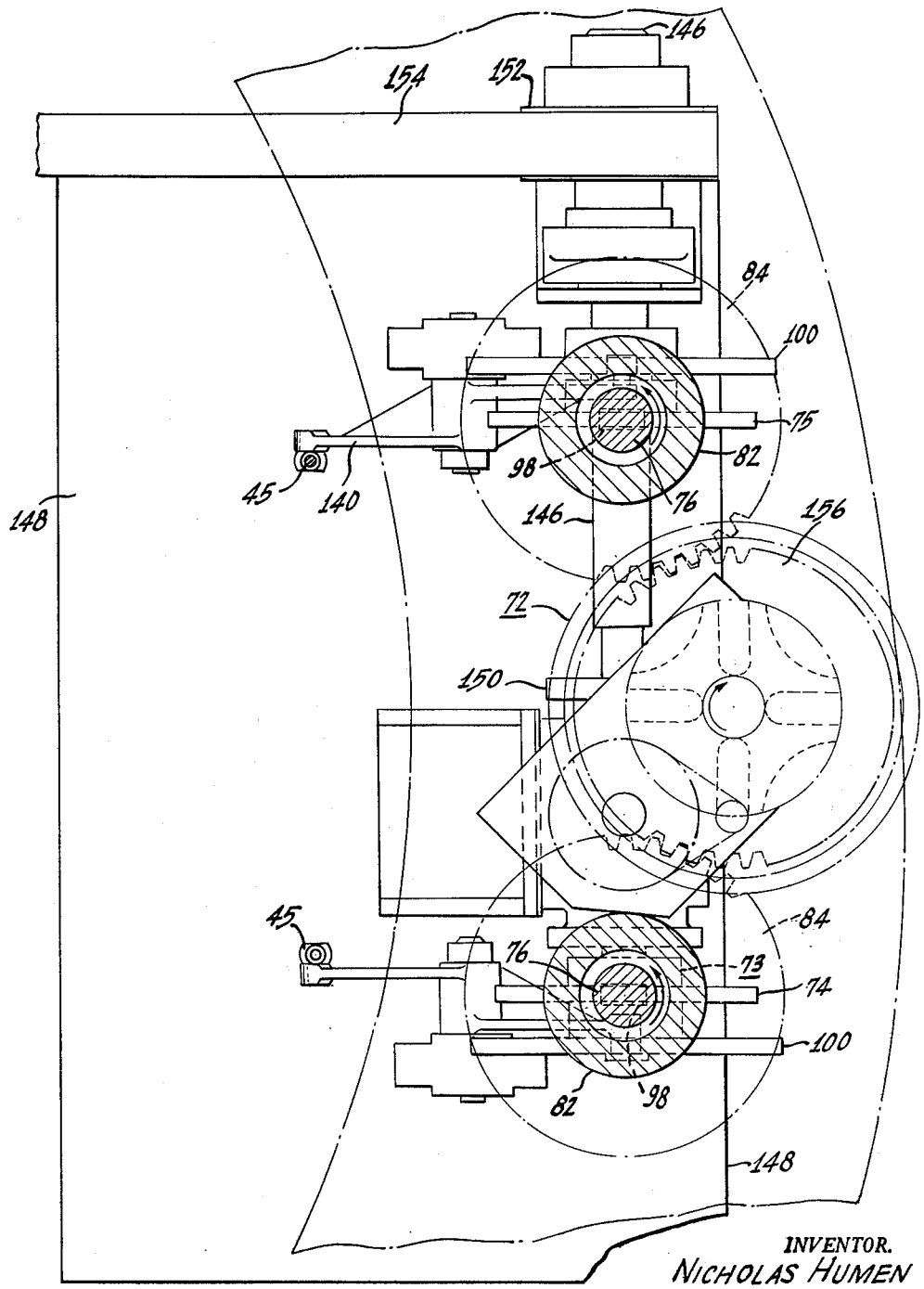

United States Patent Office 3,124,232
Patented Mar. 10, 1964

3,124,232
ELECTRON TUBE APPARATUS
Nicholas Humen, Bayonne, N.J., assignor to Radio Corporation of America, a corporation of Delaware
Filed June 1, 1961, Ser. No. 114,082
8 Claims. (Cl. 198—25)

This invention relates to a transfer apparatus for transferring a work piece from a first position to a second position. This invention is especially useful in apparatus for taking electron tube cages out of a storage rack, inserting them into a clamp type of cage holder of an automatic tab welding machine and, after lead tabs have been welded on the tube elements comprising the cage, taking the cage out of the clamp type cage holder and putting the cage into a further storage rack.

After an electron tube cage has been assembled, provisions are made to connect the tube elements comprising the cage assembly to appropriate pins of a tube stem. This may be done by welding short conductors, called tabs, to the several tube elements. An automatic machine is provided for welding the tabs to the tube electrodes, and this automatic machine must have cage assemblies fed thereto in properly oriented relation thereto. Further, after the tabs have been welded to the tube elements, the cage with the tabs thereon must be removed from the tab welding machine and inserted into a storage device or rack, so that the tabbed cages may be ready for the next operation to be performed thereon.

The tab welding machine with which the device of this invention may be used may comprise a plurality of orientable clamp type tube cage holders. The cage clamp, properly oriented to receive the cage, is opened and is presented to the loader, and the loader inserts a cage into the open clamp and holds it until the clamp closes. The cage must be oriented in a direction such that the holder can clamp the cage. Therefore the loader of this invention must preserve the proper orientation of the cages which they had in the storage rack in the process of loading the cage into the clamp. Similarly, after all the tabs have been welded to the cage tube elements, the cage must be unloaded from the clamp and must be presented to the storage rack in an orientation such that the storage rack can accept the cage. Therefore the unloader must preserve the orientation of the cage as it takes it out of the clamp and puts it into the storage rack. Further when the tabs have been welded onto the cage elements, the tabs extend beyond an end of the cage and interfere with the release of the cage from the clamp in the unload position of the tab welder. In the unload position, therefore, the unloader must also move the cage in a direction such that the tabs will not interfere with the removal of the cage from the holder.

It is therefore an object of this invention to provide apparatus for transferring a work piece from a storage position to an apparatus on which operations are performed on said work piece and then transferring the work piece from the apparatus to a second storage position and maintaining the work piece in a predetermined oriented position during the transfer operations.

A more specific object of this invention is to provide apparatus for removing a work piece, here shown as a vacuum tube cage, from a storage rack and loading the work piece, in properly oriented position, into a clamp type holder of a tab welding machine.

It is a further object to provide apparatus for removing the welded cage without interference from the clamp and loading it, in properly oriented position, into a storage rack.

The transfer mechanism utilizing this invention includes a loader and an unloader which are mounted adjacent to a turret and to a pair of cage storage racks. The turret is rotatable about apparatus, including welding apparatus, positioned inside the turret and the racks are positioned outside the periphery of the turret radially beyond the loader and unloader. The loader and unloader include radially movable slides having cage holders on the outer ends thereof. The slides are biased radially inwardly to a withdrawn position. Fluid pressure devices are connected to the slides for moving the slides outwardly against the biasing means. The cage holders are thereby moved outwardly to load and unload clamps mounted on the turret. The transfer mechanism transfers cages from a rack to a clamp, and after work is done on the cage, from a clamp to another rack. Additional mechanism is provided to move the unloader vertically to clear the end of a cage out of its cage clamp.

The invention is more fully explained in the following description thereof together with the several figures of the drawing in which:

FIG. 1 is a perspective view of an electron tube cage having tabs welded to the electrodes thereof;

FIG. 2 is a partial plan view of apparatus embodying the invention, showing the relative position of the transfer mechanism comprising the loader and the unloader with relation to the cage storage racks and the cage clamps of the tab welding machine;

FIGS. 3a and 3b are elevational views, partially broken away and partially in section, of the unloader of FIG. 2, and showing a portion of the storage rack, a section of the cage clamp, and apparatus for operating the unloader and the cage clamp;

FIG. 3c is an elevational view showing the cams used with the loader;

FIG. 4 is a sectional plan view on line 4—4 of FIG. 3b of the operating mechanism for the loader, for the unloader and for the cage clamps, and indicating, in phantom, the positions of portions of the loader and unloader with respect thereto;

FIG. 5 is a plan view of a cage holder used with the loader or unloader;

FIGS. 6 and 7 are plan views of a modified cage holder preferably used with the loader, respectively in closed and in opened position;

FIG. 8 is a side elevational view of a cage holder shown in FIGS. 6 and 7; and,

FIG. 9 is a side elevation of a further modified cage holder.

Like reference characters refer to like parts.

As stated above, a step in the process of making vacuum tubes includes welding conductive tabs to the electrodes of a vacuum tube cage. In FIG. 1, a vacuum tube cage 10 of the multi-unit type is shown, and comprises the end wafers or spacer members 12 and 14, usually of mica, between which the electrodes of the tube cage are held. Of these electrodes, the anodes 16 and 18 of the shield 20 are shown in this figure. The ears 22 on the anodes, the ears 24 on the shield, the ends 26 of the side rods of the grid and the ends 28 of the cathodes extend beyond the end wafer 12. Short conductive tabs 30 are welded to one or more of the tube elements beyond an end wafer, by an automatic machine which has been developed for this purpose.

The relative positions of the indexable turret 44, the storage racks 46 and 48, the loader 56 and the unloader 58 is shown in FIG. 2. As shown therein, a plurality of tube clamps 32 are mounted on turret 44 of the automatic tab welding machine 43 at indexing positions thereof. The turret 44 is indexed in a counter clockwise direction, as shown in this figure, and at selected ones of the indexed positions thereof, operations, such as welding tabs onto electron tube electrodes, are performed on the electron tube cages held in clamps 32. Tabless cages are stored in rack 46 and loader 56 takes cages individually from rack 46 and places them into a clamp 32 adjacent the loader. Tabbed cages are taken from a clamp 32 by unloader 58 and placed in storage rack 48.

At the loading position, a cage 10 (FIG. 1), which has been taken from the storage rack 46 (FIG. 2) is inserted into the clamp 32 by the loader means 56. The cage is carried around by the turret 44 and at predetermined positions thereof, tabs are welded to the tube elements. A clamp, carrying a cage having the tabs welded thereto, arrives at the unloading position. At the unloading position, unloader 58 takes the cage from the clamp 32 and inserts it into the storage rack 48.

The automatic tab welding machine comprises an orientable clamp type cage holder 32 (see FIG. 3a) having centering rods 34 shaped and spaced to fit indentations 36 in the wafers 12 and 14 of the cage 10 of FIG. 1. The clamp 32 (FIG. 3a) also comprises a stationary clamp jaw 38 having an opening 39 provided with a funnel shaped edge 40 into which the upper wafer 12 of a cage 10 may be fitted by the movable spring-pressed lower clamp jaw 42 when a properly oriented cage 10 is inserted into the clamp 32. The cage 10 is moved by a slide 62 (FIG. 3a) until indentations 36 in the end wafers 12 and 14 of FIG. 1 contact the centering rods 34 (FIG. 3a) of the open clamp 32. The lower jaw 42 of the clamp 32 is moved up by a spring means (not shown) within the hollow cylinder 41 on which the lower jaw 42 is mounted. In moving upwardly, the lower jaw 42 pushes the cage 10 upwards until the upper wafer is fitted into the funnel portion 40 of the upper clamp jaw 38.

For the purpose of loading and unloading the clamp 32, the lower clamp jaw 42 is pulled downward by pull rod 45 having yoke 47 which embraces the button 49 fixed to the bottom end of the hollow cylinder 41. Two pull rods 45 are provided (see FIG. 4), one cooperating with the clamp at the loading station and the other cooperating with the clamp at the unloading station. The ends of the vacuum tube elements, therefore, extend through the upper wafer and are accessible from above the clamp 32 (FIG. 3a) for welding the tabs to the tube element ends in the operation of the automatic tab welding machine 43 of which this clamp 32 is a part. After the tabs 30 have been welded to the tube element ends, the tabs project upwardly above the upper jaw 38 of the clamp 32 sufficiently far so that the cage 10 must be moved downwardly before it can be removed from the clamp 32. After removal from clamp 32, the tabbed cage 10 must be inserted into a storage means.

As noted above, the mechanism for opening clamp 32 includes pull rod 45. The lower end of the pull rod 45 is pivoted on the end of a lever 140 of the first class, and the other end of lever 140 carries a roller 142 which contacts a cam 100. In this manner when a clamp 32 arrives at the load or unload position of the tabbing machine 43, yoke 47 on the pull rod 45 engages button 49. When the cam 100 rotates, the cam face causes the pull rod 45 to move down to open the clamp 32. In this manner the clamps at the load and at the unload positions are opened and after loading and unloading, respectively, are permitted to be closed by the spring means (not shown) in the hollow jaw support 41 of each clamp 32.

Cage storage means or racks 46 and 48 (FIG. 2) are positioned in radial alignment with the loading and the unloading positions of the tabbing machine 43. While these racks 46 and 48 are shaped to fit the work piece stored therein, the racks here shown comprise channels 50 having raised guide ways 52 at the bottom thereof to fit between tube element ends, for example, between the grid side rod ends 26 of the cage of FIG. 1. Spring means 54 are provided at the open end of the channels 50 to prevent the cages therein from being pushed out of the rack by spring means (not shown) which urges the cage towards the open end of the channel. The loader 56 is located between the loading rack 46 and the loading position of the turret 44. The unloader 58 is located between the unloading position of the turret 44 and the unloading rack 48.

The tabbing machine 43, see FIGS. 2 and 3a, comprises an indexable turret 44, only a portion of which is shown, on which a plurality of clamps 32 are mounted. The tab welding machine is not described in detail herein since it is not part of this invention and description thereof is not necessary for the understanding of this invention. The tab welder is described operationally only.

While this loading and unloading operation may be done by hand, automatic means for performing these operations are quicker, cheaper and more accurate than hand operations. This invention relates to a cage loading and unloading apparatus for this purpose.

The indexable loading and the unloading apparatus, i.e. loader and unloader, 56 and 58 are described in connection with FIGS. 3a, 3b, 3c and 4. The unloader is described in detail and the loader is described only by comparison with the unloader. The unloader 58 comprises an indexable turret 60 (FIG. 3) having four slides 62 projecting radially therefrom at 90° intervals. The slides 62 are slidable in radial directions and have cage holding means 64 fixed at the ends thereof. Resilient means such as springs 66 are provided for urging slides 62 to their innermost positions. Power means such as air cylinders 68 and 70 are provided to move the slides 62 outwardly to cage engaging and releasing positions.

A Geneva mechanism 72 (FIG. 3b) is mounted on support plate 148 to index the loading and unloading turrets through 90° angles and cam means 73 (FIG. 4) are provided for lowering the unloader turret 58 after a cage holder on a slide thereof has contacted a cage in its clamp 32 and while the clamp is being opened. Further mechanism is provided for properly synchronizing the various operations of the loader and unloader with the operations of the automatic tab welder.

For convenience of illustration, the upper part of the unloader 58 is shown in FIG. 3a and the lower part is shown in FIG. 3b. The loader 56, being directly behind the unloader 58 in FIGS. 3a and 3b, does not show therein. The loader and unloader mechanism includes adjacent turrets 60, one located between a storage rack 46 and the loading position of the tab welding machine turret 44, and the other located between a storage rack 48 and the unloading position of the tab welding machine turret 44.

The turret 60 (FIG. 3a) is fixed by pin 61 to the top of shaft 76. The shaft extends downwardly through upper shaft housing 78 through a gear housing 80 (FIG. 3b) and through a lower shaft housing 82. A gear 84 is positioned in housing 80 and the shaft 76 is slidable therethrough. A gear housing plate 86 forms a closure for the top of the gear housing 80 and is fixed thereto. The housing plate 86 is supported by support plate 88 which is positioned adjacent the turret of the tab welder 43 and between it and the storage rack 46. The bottom end of the shaft 76 rests on and is fixed to a shaft support 90, having a greater lateral extent than the shaft 76. A compression spring 92, which surrounds the lower end of the shaft 76, is provided for a purpose to be explained between the laterally extending portion of the shaft support 90 and a collar 94 which extends inwardly from the lower shaft housing 82 and above the shaft support 90. A cam follower support 96, in contact with the shaft support 90, is slidably but non-rotatably positioned in the bottom portion of the lower shaft housing 82 and projects therefrom. The cam follower support or slide 96 carries a cam follower roller 98 which rides on cam 74. Therefore upon rotation of gear 84, shaft 76 and the turret 60 and all structure mounted thereon may be rotatably indexed by means to be described, and the shaft 76 may be raised by the cam 74 in contact with roller 98, the spring 92 keeping the shaft in the lowest position that the cam 74 permits.

The turret 60 includes a circular table 102 mounted at the upper end of shaft 76. The table 102 comprises a hollow cylinder with a thick peripheral wall 104. Four bushings 106 (only one of which is shown) are radially positioned in the thick walls 104 at 90° angles from each other. A rectangular slide 62 is slidably mounted in each bushing 106. Each slide 62 has a longitudinal bore 108 extending thereinto from the radially inward end of the slide. A tension spring 66 extends into the bore 108 in the slide 62 and is connected between a reduced diameter top end 110 of the shaft 76 and a pin 112, fixed in the bore 108. This spring 66 urges each slide 62 radially inwardly. A vertically arranged pin 114 extends downwardly through the end of slide 62 which projects beyond the annular member 104 for a purpose to be described. A cage holder, generally indicated at 64 is mounted at the end of slide 62 by bolts 116 beyond the pin 114. The cage holder 64 is described below.

A stationary table 118 is mounted below the turret 60 at the top of the upper shaft housing 78 and may be supported, parallel to the turret 60, in any known manner. Two radially extending air cylinders 68, 70 are mounted on the table 118. The piston rod 122 of air cylinder 70 extends towards the unloading position of the turret 44 and the piston rod 122 of air cylinder 68 extends towards the storage rack 48. A slide pusher 126 is mounted on the end of each piston rod. The slide pusher 126 comprises a notched element into which the pin 114 extends, whereby the slide pusher engages the pin. The notch is deep enough so that the pin 114, and therefore the turret 60, may move downwardly as will be described. A roller 128 is provided on the notched element projecting into the notch for anti-friction engagement with rod 114. Slotted guides 130 are mounted on the table 118 and pins 132 projecting from slide pushers 126 extend in guiding relation thereinto to prevent rotary motion of piston rod 122. Stop means 134 and 136 are mounted near the ends of the guides 130 for limiting the travel of the piston rods 122, 122. The stop 136 at the loading position has a vertically extending portion 138 for a purpose to be described.

The loader and unloader turrets 60 must each be properly indexed through 90° and the several cams 74, 75, 100, 100 must be rotated one revolution each time the loader and indexing unloader are indexed, all in synchronism with the indexing of the turret 44 of the automatic tab welder 43. A conventional Geneva type of indexing means 72 is provided for this purpose and is shown in FIGS. 3b and 4. It is described only as appears necessary. A horizontal shaft 146 is mounted on support plate 148 by bracket 149 in suitable bearings and extends through gear box 150. A pulley 152 is fixed to shaft 146 and the shaft 146 is rotaed by belt 154 driven in synchronism with the drive means for the indexer (not shown) of the turret 44 of the automatic tab welding machine 43. The cams 74, 75, 100 and 100 are fixed to the shaft 146. The follower 142 of lever 140 contacts the bottom of the two cams 100, 100. The rollers 98, see FIGS. 3b and 4, of cam followers 96 fitted into the bottom of the lower shaft housings 82 rest on cams 74 and 75. Since it is not necessary to lower or raise the slides of the loading turret 56, the cam 75 (shown in FIGS. 3c and 4) supporting the shaft of the loading turret 56 is circular. However, since it is necessary to lower the unloading turret 58 to unload a tabbed cage from cage clamp 32, the cam 74 (shown in FIGS. 3b and 4) supporting the shaft of the unloading turret 58 is shaped to lower the unloading turret in synchronism with the opening of the cage clamp 32 at the unloading position of the turret 44. In this manner, the cage 10 in the clamp being unloaded is lowered sufficiently so that the tab wires 30 welded to the cage elements clears the plate 38 of clamp 32. The cams 100, 100 are also mounted on the shaft 146 at the loading and unloading positions and cooperate with the pull down means that open the clamps 32 at the loading and unloading position of the turret 44.

The conventional Geneva type indexing means 72 is described only in function. A gear 156, which is indexed one-quarter revolution for each revolution of shaft 146 by the Geneva type indexing mechanism 72, meshes with gears 84, 84 of the loader and unloader, as shown in phantom in FIG. 4. Thereby, one revolution of shaft 146 causes one revolution of cams 74, 75, 100, 100, and also causes one-quarter revolution of either the loader and unloader turrets 56 and 58 in a known manner, these turrets not rotating during a portion of the rotation of shaft 146.

Cage holding means are mounted on the end of each slide. While plain magnetic cage holders shown in FIG. 9 and described below may be used on the unloader slides, spring type cage holders may be used on both loader and unloader slides. The cage holder mounted on the loader slides comprises resilient fingers to take a cage out of storage rack 46. After two indexed 90° rotations of the loader turret 60 carrying the slides 62, a pair of slides interchange position. One slide thrusts a cage 10 into the open cage clamp 32 on the automatic tab welder turret and the diametrically opposite slide picks up a cage from storage rack 46. A form of cage holding means for the unloader or loader is shown in FIGS. 3a and 5. This cage holder comprises a spacer 158 fixed beneath and extending beyond the slide 62. A lower portion 160 of the spacer 158 is wider than the end of the slide 62, whereby the lower portion 160 extends laterally beyond the slide 62. A jaw holder 162 of channel shape having grooves for the wider portion 160 of the spacer 158 is slidably mounted beneath the spacer 158. A part of the jaw holder 162 is cut away at its forward upper portion as shown in 164 and the jaws 166 are riveted to the jaw holder 162 within the remaining upper part of the jaw holder 162. The jaws 166 project forward into the space provided above the forward portion of the jaw holder 162 and past the forward end of the spacer 158. A pin 168 extends through the spacer 158 and downwardly therefrom. A tension spring 170 is connected between the pin 168 and a depending lug 172 on the jaw holder 162. The jaw holder 162 and its jaws 166 are therefore urged forwardly, that is, radially outwardly, with respect to the spacer 158 and also with respect to the turret on which the jaws 166 are mounted. The lug 172 extends down far enough so as to contact the upwardly extending stop 138 (adjacent clamp 32) when the slide 62, directed towards the clamp 32, moves the cage holder 64 to its outward position.

The jaws 166 are identical and are secured to the jaw holder 162 in oppositely disposed relationship. Each jaw 166, which is made of sheet spring material, is bent in the shape shown in FIG. 5. In general, the ends of the jaws are bent outwardly to form an outwardly flared portion 174. The jaws 166, continuing inwardly from the flared portion, are bent away from each other. The jaws then continue radially inward for a short distance. The jaws, as they continue toward their inner ends are bent towards each other, and immediately away from each other, the final portion of the jaws being straight and extending radially. The final radially extending portion is riveted to the jaw holder 162. The jaws 166 therefore comprise bent portions 176. The spacer 158 is shaped to fit the bent portions 176 of the jaws 166, whereby, as will be explained below, when the jaws 166 are held stationary as the spacer 158 moved forwardly with the slide 62, the jaws are opened to release a cage 10 held in the bent portion 176 of the jaws.

A preferred jaw is shown in FIGS. 6, 7 and 8. The preferred jaw comprises a spacer 180 which is fixed to the end of the slide 62. This spacer also has laterally projecting portions 182 thereon and the jaw holder 184 is slidably mounted on the spacer 180, the projecting portions 182 fitting into slots in the jaw holder 184. Two pins 186 extend from the top of jaw holder 184, and identical jaws 188 are pivotally mounted on the pins 186. The jaws 188 face each other. Pins 190 are set into the jaws 188 about midway of the length and a tension spring 192, stretched between pins 190, urges the jaws 188 towards each other. The jaws 188 have inturned tips 194 and at a position 196 between the pins 190 and the tips 194, a portion of each jaw is cut away to provide a cam surface. The spacer 180 is shaped to substantially fit the cut away portion 196 of both jaws 188. The spacer 180 also has a forwardly extending tongue 197 for a purpose to be described. A pin 198 extends downwardly from the spacer 180 and a tension spring 199 (FIG. 8) is connected between the pin 198 and a downwardly extending lug portion 200 of the jaw holder 184, urging the jaw holder 184 forwardly with respect to the spacer 180. The downwardly extending lug 184 extends down far enough so that, as the slide 62 directed towards the clamp 32 is moved forward by the air cylinder 68, the lug 200 hits the top portion of the stop 138. As the slide 62 continues to go forward, the spacer 180 moves forward with respect to the jaws 188, and opens them. The tongue 197 in moving forward pushes a cage out of the opening jaws.

The spring type of jaws just described are used to clasp the cage in the loader storage rack 46 and to release the cage into the cage clamp 32 in the load position of the turret 44 although they can be used on the unloader. A magnetic cage holder may, alternatively, be used to take the tabbed cage 10 out of the clamp 32 in the unload position of the turret 44 after the clamp 32 has been opened, and to thrust the tabbed cage 10 into the unloader storage rack 48. Such clamps are merely square ended magnets 202 fixed below the end of slide 62 as shown in FIG. 9.

The loader and unloader are substantially identical. Only one pair of cams are different, it being understood that magnetic cage holders may be used only on the unloader, while spring type of cage holders are fixed to the ends of the loader slides. The cam 75 on which the cam follower 98 of the loader 56 rides is a plain circular disk, since, as noted above, the loader 56 does not move up or down during operation. The cam 74 on which the cam follower 98 of the unloader 58 rides has a portion cut therefrom as shown at 201. The cams 100 that operate the pull downs 45 have a contour similar to that of the cam 74. The contours of the cams 74 and 100 are so formed that the unloader turret moves down in synchronism with the motion of the lower jaw 42 of the cage clamp 32 at the unloader position of the tabbing machine turret 44.

The operation of the loader device of this invention will be described first. In the beginning of a cycle, the turret 44 of the automatic tabbing machine 43 presents an empty cage clamp 32 to the loading station. All four slides 62 are retracted by their springs 66. The turret of the loader 56 is so oriented that one of its slides is directed towards the storage rack 46 and another slide thereof is directed toward the clamp 32. The two other slides mounted on the turret of the loader are directed at 90° angles therefrom. In this position one of the two other slides holds a cage it previously took out of the storage rack 46 and the other of these two slides is idle. The cam 100 rotates to a point where the pull down 45 at the loading station starts to open the clamp 32. At this moment, compressed air is applied to both air cylinders 68, 70 in the loader and the two slides 62 directed towards the clamps 32 and the rack 46 move outwardly. Spring-type cage holders, such as that of FIGS. 3a and 5 or preferably such as that of FIGS. 6, 7 and 8, are mounted on the ends of slides 62 of the loader 56. A holder directed towards storage rack 46 graps a cage 10 therein and the other oppositely directed holder thrusts the cage 10 which it has previously picked up into the cage clamp 32 and against the centering rods 34. If the holder of FIGS. 3a and 5 is used, a cage 10 in rack 46 is picked up by the flared ends 174 of resilient jaws 166 contacting the sides of the anode 16 of the cage 10 below the springs 54. Further forward motion of the slide 62 causes the jaws 166 to separate until the flared portion 174 of the jaws 166 passes the anode 16. The resilient jaws 166 then close on the anode and when compressed air is cut off from the air cylinder 68, the spring 66 retracts the slide 62 and pulls the tube cage 10 out of the storage rack 46 and past the springs 54. If the jaws of FIGS. 6, 7 and 8 are mounted on the slides 62, the jaws 188 are stopped in their forward motion by the contact thereof by the cage anode 16. The spacer 180 however continues to move forward and opens the jaws 188. As soon as the jaws 188 are opened far enough, the anode 16 of the tube cage no longer stops the forward motion of the jaws 188, and the jaws 188 are moved forward by spring 199 and close behind cage anode 16 thereby holding it. The stop 134 prevents the slide 64 from moving forward too far.

The release of the cage 10 into the clamp 32 positioned at the load position of the turret 44 is accomplished in a similar manner whether a holder of the type shown in FIGS. 3a or 5, or the holder of FIGS. 6, 7 and 8 is used. A cage 10 held in the holder on the end of the slide is pushed against the guide rods 34 of the clamp 32 in such manner that the indentations 36 of the upper and lower wafer 12 and 14 contact the guide rods 34 and locate the cage 10. At this moment, the lug 172 or 200 on the jaw holder 162 or 184, respectively, hits the upstanding stop 138, and forward motion of the jaws 166 or 188 is stopped. The spacer 158 or 180 however continues to move forward and the spacers open the jaws, releasing the cage. The cam 100 continues to rotate and the lower clamp jaw 42 comes up at this moment and pushes the cage upwards until the upwards spacer 12 is in the funnel shaped hole 40 of the upper plate 38 of the clamp 32. The compressed air is disconnected from the cylinders 68, 70 and the springs 66 draw the slides 62 back. The holder at the storage rack pulls a cage past the springs 54. However, the holder at the clamp 32 is opened and cannot pull the cage out of the closed clamp 32 and therefore the cage is released and is transferred to the clamp 32. Therefore, one holder 64 has picked up a cage 10 and the other holder 64 has released a cage.

At the unloading station 58, meanwhile, substantially converse action takes place. As noted above, at the unloading station 58, unloader slides 62 may have magnetic cage holders such as those shown at 202 in FIG. 9 mounted on the ends thereof, and the unloader turret not only indexes but also moves downwardly as it takes the cage out of clamp 32. More specifically, at the beginning of a cycle the unloader turret 60 is indexed so that a slide 62 thereof is directed towards the clamp 32 and another slide is directed towards the storage rack 48. All four slides are held in retracted position by springs 66. Compressed air is admitted to both air cylinders 68, 68 and therefore the slides 62 are moved outwardly.

The magnetic cage holder 202 directed towards the clamp 32 contacts the cage 10 when the clamp 32 is closed. As the cams 74 and 100 rotate, the lower jaw 42 of the clamp 32 moves down. The unloader turret 58, and with it the slides 62, moves down the same amount and at the same speed as the lower jaw 42 due to the shapes of the cams 74 and 100. The tabs 30 on the cage 10 now are low enough so that they clear the clamp 32. In the meantime the cage 10, held by the slide 62 directed towards the storage rack 48 is pushed past the springs 54 at the entrance thereof by the air cylinder 68. The air is then released from both cylinders 68, 68 and the slides 62 move radially inward. The slide 62 directed towards the clamp 32 has picked up a tabbed cage 10. When the slide which is directed towards the storage means 48 retracts, the cage held thereby is prevented from going with it by springs 54. Thereby, the the last-mentioned slide has deposited a tabbed cage in the storage rack. As the unloader turret moves down, the cage which was just thrust into the storage rack 48 cannot move down since it rests on the floor of the rack. However, the cage merely slides along the magnetic cage holder 202 in the rack 48 without injury to the cage 10. The other two arms of the cage unloader 58 are respectively idle and carries a cage. The action of the loader and unloader takes place substantially simultaneously and when the loader 56 and unloader 58 have indexed 90°, and the turret of the tabbing machine 43 has indexed one position, a cycle is completed.

What is claimed is:

1. A work piece transfer device comprising a stationary table, a turret mounted parallel to said table, slides each mounted on said turret for sliding in radial directions thereon, spring means for urging said slides radially inward and power means for urging said slides radially outward, said power means comprising an air cylinder fixedly mounted on said table and having a piston rod extending parallel to the directions of motion of said slides, there being mutually interengaging elements fixed to said slide and to said piston rod, a work piece holder mounted on each of the radially outward ends of said arms, and means for rotatably indexing said turret whereby, on rotatable indexing of said turret, said slides interchange positions.

2. A work piece transfer system comprising a work piece storage rack, and a work piece clamp, a rotatable turret arranged between said rack and said clamp, slides each radially arranged on said turret, each of said slides cooperating with said storage rack and with said clamp, work piece holding means mounted on an end of each of said slides, spring means for moving each of said slides in one direction on said turret, power means for moving said slides in a direction opposite to said one direction, means for opening said clamp, means for energizing said power means and said clamp opening means in timed relation to each other, and means for rotatably indexing said turret to the position where said slides interchange position.

3. A work piece transfer system comprising a work piece storage rack and a work piece clamp, a rotatable turret arranged between said rack and said clamp, a pair of slides radially arranged on said turret, each said slides cooperating with said storage rack and with said clamp, spring means for moving each of said slides in one direction on said turret, power means for moving said slides in a direction opposite to said one direction, means for opening said clamp, means for lowering said turret, means for energizing said power means, said clamp opening means and said turret lowering means in timed relation and means to rotatably index said turret to a position where said slides interchange position.

4. A transfer mechanism for transferring an electrode cage assembly from a supply rack to a cage receiving turret for performing welding operations on said cage assembly and thereafter transferring a cage assembly from said cage receiving turret to a storage rack after welding operations have been performed on said cage assembly, said transfer mechanism including a pair of turrets positioned adjacent each other and between said cage receiving turret and said racks, each of said adjacent turrets including at least one pair of oppositely disposed radially movable slides having cage holders thereon, means on said adjacent turrets for moving said holders radially outwardly when said holders are properly registered with said racks and said cage receiving turret to receive a cage assembly from said cage supply rack and depositing a cage assembly on said cage receiving turret and to remove a cage assembly from said cage receiving turret and load a cage assembly on said supply rack, and means for moving the turret which removes a cage from the cage receiving turret axially to clear said work piece with respect to said cage receiving turret.

5. A work piece transfer mechanism for transferring a work piece from a rack to a work piece turret for performing operations on said work piece, and transferring a work piece from said turret to a storage rack after said operations have been performed on said work piece, said transfer mechanism including a pair of turrets positioned adjacent each other and between said work piece turret and said racks, each of said adjacent turrets including at least one pair of oppositely disposed movable radial slides having work piece holders thereon and biased toward each other, means on said last turrets for moving said holders radially outwardly when said holders are properly registered with said racks and said work piece turret to receive a work piece from said supply rack and to deposit a work piece on said work piece turret and to remove a work piece from said work piece turret and load said last work piece on said supply rack, and means for moving the turret, which receives a work piece from the work piece turret, axially to clear said work piece turret, and power means connected to said pair of turrets for causing synchronized motion of all of said turrets during transfer operations.

6. A work piece transfer mechanism for transferring a work piece from a supply rack to a work piece turret for performing operations on said work piece, and thereafter transferring a work piece from said turret to a storage rack after said operations have been performed on said work piece, said transfer mechanism including a work piece turret, a pair of turrets positioned adjacent each other and between said work piece turret and said racks, and a plurality of work piece holding clamps mounted on said work piece turret, each of said adjacent turrets including at least one pair of oppositely disposed radially movable slides having work piece holders thereon and biased toward each other, means on said adjacent turrets for moving said holders radially outwardly when said holders are properly registered with said racks and said work piece turret to receive a work piece from said supply rack and deposit a work piece on said work piece turret and to remove a work piece from said work piece turret and load a work piece on said supply rack, and means connected with said pair of turrets for opening and closing said clamps in timed relation with said holder moving means.

7. A work piece transfer mechanism for transferring a work piece from a supply rack to a work piece turret for performing operations on said work piece, and thereafter transferring a work piece from said turret to a storage rack after said operations have been performed on said work piece, said transfer mechanism including a work piece turret having a plurality of work piece holding clamps thereon, a pair of stationary tables positioned adjacent each other and between said work piece turret and said racks, each of said stationary tables having a rotatable turret mounted thereon, and each of said turrets including at least one pair of oppositely disposed radially movable slides having work piece holders thereon and biased toward each other, power means fixedly mounted on said tables for engaging and moving said holders radially outwardly when said holders are properly registered with said racks and said work piece turret to receive a work piece from said supply rack and deposit a work piece on said work piece turret and to remove a work piece from said work piece turret and load a work piece on said supply rack, and power means connected to said pair of turrets and said clamps for causing synchronized motion of all of said turrets and opening and closing of said clamps during transfer operations.

8. A work piece transfer mechanism for transferring a work piece from a supply rack to a work piece turret for performing operations on said work piece and thereafter transferring a work piece from said turret to a storage rack after said operations have been performed on said work piece, said transfer mechanism including a pair of turrets positioned adjacent each other and between said work piece turret and said racks, each of said adjacent turrets including at least one pair of oppositely disposed radially movable slides having work piece holders thereon and biased toward each other, means on said adjacent turrets for moving said holders radially outwardly when said holders are properly registered with said racks and said work piece turret to receive a work piece from said supply rack and deposit a work piece on said work piece turret and to remove a work piece from said work piece turret and load a work piece on said supply rack, and means for moving said turret removing a work piece from said work piece turret axially to clear said work piece turret, and power means connected to said pair of turrets for causing synchronized motion of all of said turrets during transfer operations.

References Cited in the file of this patent

UNITED STATES PATENTS

| | | |
|---|---|---|
| 1,775,381 | Angus | Sept. 9, 1930 |
| 2,878,620 | Calehuff | Mar. 24, 1959 |
| 2,998,887 | Sommer | Sept. 5, 1961 |